United States Patent Office 3,465,491
Patented Sept. 9, 1969

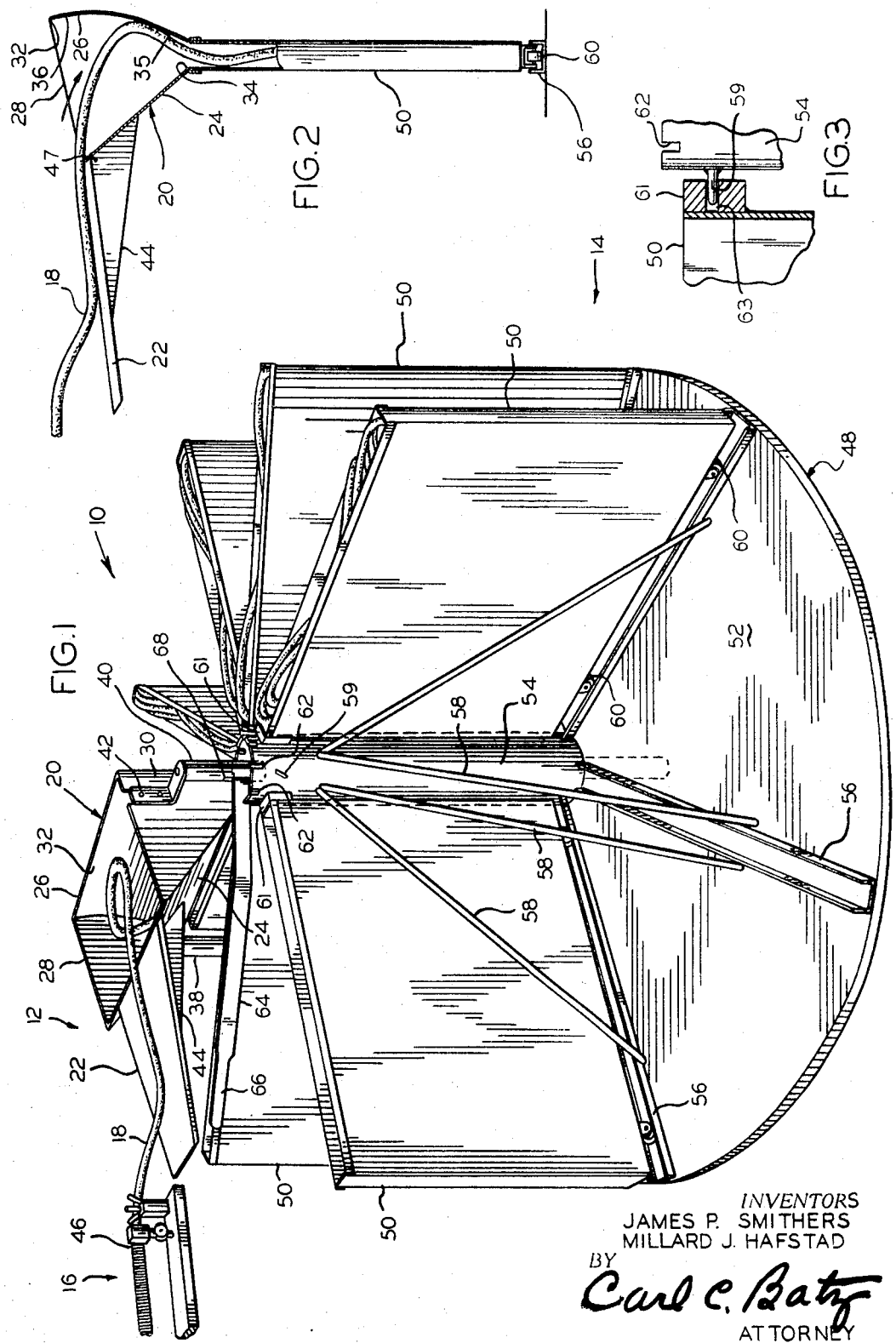

3,465,491
APPARATUS FOR COLLECTING FLEXIBLE STRANDS
James P. Smithers, Glendale Heights, and Millard J. Hafstad, Park Forest, Ill., assignors to Armour and Company, Chicago, Ill., a corporation of Delaware
Filed Mar. 21, 1966, Ser. No. 535,872
Int. Cl. B65b 63/04, 67/00
U.S. Cl. 53—116     13 Claims

ABSTRACT OF THE DISCLOSURE

Apparatus for collecting flexible sausage strands which comprises an elongated bank board for successively directing sausage strands thereagainst and a plurality of turntable mounted, open top compartment means adapted to be rotated to a position beneath the bank board for collecting the strands therein. The bank board is substantially laterally coextensive with each of the compartment means whereby the strands directed thereto assume a folded serpentine configuration.

---

This invention relates to a method and apparatus for collecting flexible strands as they are manufactured. More particularly, the invention relates to the collection of flexible strands in a manner which will facilitate subsequent process operations.

Various products are made by producing long flexible strands of material and subsequently processing the strands to produce finished products. Thus, for example, sausage products such as frankfurters are produced by stuffing a comminuted meat mixture into long lengths of a suitable casing such as tubular cellulose film. The lengths of material subsequently are subdivided, smoked, and cooked. Other examples of the production of flexible strands of material and subsequent processing of the strands are found in the manufacture of candy and products made from dough.

In large scale operation, it is desirable that a number of strands be collected for further processing plurality or group of strands together in suitable apparatus. When processing frankfurter sausages, it is advantageous to supply a number of strands simultaneously to apparatus that forms the strands into links corresponding in length to individual sausages to be produced. Before the strands are supplied to the linking apparatus, they are accumulated as they issue from the stuffer. Previously, the strands issued from the stuffer onto a table, and the strands were supplied from there to the linking apparatus. It was inconvenient and time-consuming to handle the strands collected in this manner, and it was necessary to remove loops and tangles in the strands.

An important object of the invention is to provide a method and apparatus for collecting flexible strands as they issue from manufacturing apparatus, in order to accumulate a plurality of strands for subsequently processing them together.

Another object is to provide a method and apparatus for collecting flexible strands in an orderly efficient manner as rapidly as they are produced, to permit fast stuffing and rapid transportation to subsequent processing apparatus.

An additional object is to provide a method and apparatus for collecting flexible strands which minimize manual operations and lower the cost of manufacture.

A further object is to provide a method and apparatus for collecting long flexible strands in neat compact folded condition without damaging the strands, so that the strands may be supplied directly to processing apparatus and unfolded as they are supplied to the apparatus without obstruction or damage.

A specific object is to provide a method of collecting flexible strands wherein the strands are caused to assume a serpentine or sinuous configuration and are collected in folded condition. Another specific object is to provide apparatus for collecting flexible strands which includes a bank board or the like against which the strands are directed to cause them to assume a serpentine configuration, and an accumulator having a plurality of compartments for collecting the strands in folded condition.

A particular object is to provide a method and apparatus accomplishing the foregoing objects in the collection of flexible sausage strands as they issue successively from a sausage stuffer.

A further object is to provide a simple, economical, and efficient method and apparatus for collecting flexible strands. These and other objects, advantages, and functions of the invention will be apparent on reference to the specification and to the attached drawings illustrating a preferred embodiment of the method and apparatus, wherein like parts are identified by like reference symbols in each of the views, and wherein:

FIGURE 1 is a perspective view of the collecting apparatus with a holder thereof removed for purposes of illustration, illustrating the apparatus in use;

FIG. 2 is an elevational and partly broken and sectional view of a loading chute, an apron, and a holder in the apparatus, illustrating the apparent in use; and FIG. 3 is an enlarged fragmentary partly sectional view of the inner end of a holder and an adjacent hub in the apparatus, illustrating structure for positioning the holder.

Referring to the drawings, a preferred embodiment of collecting apparatus 10 includes a receiver 12 and a rotary accumulator 14. The collecting apparatus is associated with a sausage stuffer 16, which may be of conventional construction, for receiving, stacking and storing round or generally cylindrical stuffed strands 18 as they issue successively from the stuffer. The strands in the illustrative embodiment are 160 feet in length.

The receiver 12 includes a funnel-like loading chute 20 and an apron or table 22 mounted thereon. The chute includes elongated downwardly converging front and back walls 24 and 26, and parallel side walls 28 and 30. A relatively wide rectangular mouth 32 is formed at the top of the chute, and a narrow rectangular discharge opening or slot 34 is formed at the bottom of the chute. The front wall 24 is flat and inclines upwardly and forwardly from the discharge opening. The back wall 26 includes a flat lower section 35 that inclines upwardly and rearwardly from the discharge opening, and an integral arcuate upper section 36 forming a continuation of the lower section and terminating at the mouth of the chute. The upper section constitutes the major portion of the back wall, and it has a vertically curving concave inner surface. The back wall provides a bank board or bumper board in use, as will appear from the description which follows.

The cute 20 is supported by a standard 38 secured to one side wall 28, and by a standard 40 and a bracket 42 secured to the standard and to the other side wall 30. The standard 40 also constitutes an axle in the accumulator 14, as described hereinafter. The apron 22 is secured to the chute centrally along the upper edge of the front wall 24, by suitable means such as brazing. The apron is supported by struts 44 secured to the front wall of the chute and to the bottom of the apron. The apron is inclined upwardly and rearwardly from the front of the receiver to the chute.

The receiver 12 is mounted on a floor or other suitable supporting surface, not illustrated, adjacent to the discharge end 46 of the stuffer, constituting the end of its stuffing horn. The apron is aligned with the stuffer so that the strand 18 issues onto the apron about midway between its sides and is directed at about the center of the back wall 26 of the chute.

In the illustrative preferred embodiment, it has been found that the desired results are achieved with the following dimensions, angles and spacings: The lower section 35 of the chute back wall 26 extends upwardly from the opening 34 at an angle of 70 degrees from the horizontal. The front wall 24 extends upwardly at an angle of 35 degrees front the horizontal. The upper section 36 of the back wall 26 is cylindrically curved in an arc of 12 inch radius about a horizontal axis 47 adjacent to and slightly below the upper edge of the front wall 24. The vertical distance of the axis 47 above the opening 34 is 7½ inches. The vertical distances of the upper and lower ends of the upper back wall section 36 above the opening 34 are, respectively, 12 inches and 3 inches. The chute back wall 26 is spaced about 41 inches from the discharge end 46 of the stuffer. The apron 22 is inclined at an angle of about 15 degrees from the horizontal.

The foregoing dimensions are illustrative of a frankfurter sausage stuffing, receiving, and collecting operation, and they are subject to variation depending upon the operation of the stuffer or other manufacturing apparatus, and the type and size of the strand material. The dimensions are determined experimentally as based upon performance.

The accumulator 14 includes the standard or axle 40, a turntable 48 mounted on the standard for rotation about the vertical axis thereof, and eight portable strand holders or boxes 50 removably mounted on the turntable. The standard 40 is rigidly mounted on a floor or other supporting surface, such as by embedding the lower end of the standard in or securing it to a floor, by conventional means not illustrated .

The turntable 48 includes a horizontal circular platform or base 52 and a vertical hub or sleeve 54 centrally secured to the platform and journaled on the standard 40. Eight rails 56 in the form of channel members are mounted on the platform and extend radially from the hub at equal angles therearound. Eight pairs of support rods 58 are joined at opposite ends thereof to the platform and to the hub, with the rods in each pair disposed in parallel and adjacent to opposite sides of one of the rails. The rods support the platform from the hub, and they serve as side supports for the holders 50. Eight guide pins 59 are mounted on the hub adjacent to its upper end, and they extend radially from the hub above the rails at equal angles around the hub.

Each of the holders 50 is an elongated deep narrow box having an open top and closed sides and bottom. Two rollers or wheels 60 are mounted on the bottom of each holders, respectively in adjacent spaced relation to the opposite ends thereof. The rollers are received in the rails 56 to retain the holders in their proper positions and for moving the holders onto and off of the turntable. A guide block 61 having a central pilot hole 63 is mounted externally on one end of each holder adjacent to the top of the holder. The pilot hole receives one of the guide pins 59 therein for positioning the holder accurately with respect to the hub 54. The support rods 58 limit the possible side sway of the holders.

The holders 50 provide compartments on the turntable for collecting the flexible strands 18 in vertically folded condition therein. In the illustrative embodiment, the width of each compartment is approximately several times the thickness of the strand, and each compartment will hold a 160 foot strand folded vertically therein in the manner in which the folds accommodate themselves to the lateral restraint imposed upon them by the sides of the holders. Thus, the folds extend approximately for the length of each holder, and the folds are generally one above the other and may also be somewhat to the side of adjacent folds.

The receiver 12 and the accumulator 14 are arranged so that the open tops of the holders 50 successively register with the discharge opening 34 in the chute 20 when the turntable 48 is rotated, for collecting successive strands 18 from the receiver in the compartments of the respective holders. The upper end of the hub 54 is provided with eight latching slots 62 corresponding respectively to the registering positions of the eight holders. A latch arm 64 having a handle portion 66 is pivotally mounted in a slot 68 in the standard 40. The latch arm may be received in any of the slots 62 for latching the accumulator in position to receive a strand in one of the holders 50. The operator raises the latch arm by its handle to free the turntable for rotation and permit successive holders to be moved to registering positions beneath the chute 20. The latch arm is lowered to engage a slot 62 for latching the accumulator as each holder registers with the chute.

In operation, an empty holder 50 is moved into registering position beneath the chute 20. A strand 18 issues from the stuffer 16 onto the center of the apron 22 in the direction of the chute back wall 26. As the strand issues from the stuffer, it is directed by the apron against the back wall. The back wall serves as a bank board or bumper board, and the flexible strand bends and commences downward movement under gravity as the strand continues to issue from the stuffer. The strand assumes a serpentine or sinuous configuration as it moves downwardly along the back wall. The strand is laterally restrained by the sides of the discharge opening 34 and the sides of the holder 50, and it enters the holder. The serpentine movement of the strand causes it to fold back and forth as it is received in the holder, so that it is vertically folded therein. Eventually, the holder is filled with a 160 foot strand in a series of stacked vertical folds. The accumulator 14 then is rotated to advance and fill successive holders 50 with successive strands in like manner.

The holders filled with strands are removed from the turntable on their rollers and are transported to the apparatus performing the next operation on the strands, in this case, the linking apparatus. Alternatively, the filled holders may be held or stored temporarily while additional holders are filled, or until it is desired to operate the linking apparatus or the apparatus is ready to receive additional strands. Meanwhile, the stuffer 16 may continue in operation to produce additional strands 18 and fill them in additional holders 50.

The holders 50 are especially advantageous in that they serve as feed sources for the linking apparatus. A bank of twelve holders, for example, may be assembled at the feed end of the linking apparatus, and the upper free ends of the strands in the several holders are inserted in the linking apparatus. As the strands are advanced in the apparatus, they unfold from the holders and are removed readily and without obstruction, tangles, or damage, with no labor required. When the holders are empty, they may be replaced by filled holders, and the empties are returned to the accumulator for refilling.

The invention thus provides a new and improved method and apparatus for collecting flexible strands in an orderly, efficient and reliable manner conducive to a high rate of production of a continuous nature while minimizing labor requirements and reducing the cost of manufacture. While a preferred embodiment of the new method and apparatus have been illustrated and described, it will be apparent to those skilled in the art that various changes and modifications may be made therein within the spirit and scope of the invention. It is intended that such changes and modifications be included within the scope of the appended claims.

We claim:

1. Apparatus for collecting flexible strands which comprises, in combination, an elongated bank board for successively directing flexible strands thereagainst, a plurality of elongated open top compartment means adapted to be disposed individually beneath said bank board for collecting said strands therein, said bank board being substantially laterally coextensive with each of said open top compartment means, and means mounting said compartment means for successively moving them beneath said bank board to collect successive strands in the respective compartment means, whereby said strands when directed against said bank board assume a serpentine configuration and are collected in folded condition in said compartment means.

2. Apparatus as defined in claim 1 wherein said bank board has a vertically curving concave surface against which said strands are directed.

3. Apparatus as defined in claim 1 including an upwardly inclined apron spaced in front of said bank board for directing said strands against said bank board.

4. Apparatus as defined in claim 1 wherein said mounting means comprises a turntable having said compartment means mounted radially thereon, and means rotatably mounting said turntable.

5. Apparatus as defined in claim 4 wherein said compartment means comprise portable holders removably mounted on said turntable.

6. Apparatus as defined in claim 4 including means for latching said turntable in respective collecting positions of said compartment means beneath said bank board.

7. Apparatus for collecting flexible strands which comprises, in combination, a loading chute for successively feeding flexible strands thereto having elongated front and back walls converging downwardly to a narrow discharge opening, a turntable for rotation about a vertical axis, means providing a plurality of radial elongated open top compartments on said turntable for collecting said strands therein, said opening being substantially coextensive with each of said open top compartments, the tops of said compartments successively registering with said discharge opening when said turntable is rotated for collecting successive strands in the respective compartments, whereby flexible strands when fed to said chute and directed against the back wall thereof assume a serpentine configuration in said chute and are collected in folded condition in said compartments.

8. Apparatus as defined in claim 7 wherein said chute back wall has a vertically curving concave inner surface.

9. Apparatus as defined in claim 8 including an upwardly inclined apron adjacent said chute front wall for directing said strands against said chute back wall.

10. Apparatus as defined in claim 9 associated with apparatus arranged to issue said strands onto said apron in the direction of said chute back wall.

11. Apparatus as defined in claim 7 wherein said compartment means comprise portable holders removably mounted on said turntable.

12. Apparatus as defined in claim 11 wherein said holders comprise deep narrow boxes for collecting said strands in vertically folded condition.

13. Apparatus as defined in claim 7 including means for latching said turntable in positions wherein the respective compartment tops register with said chute discharge opening.

References Cited

UNITED STATES PATENTS

| | | | |
|---|---|---|---|
| 1,557,830 | 10/1925 | Gurley | 19—159 |
| 2,304,260 | 12/1942 | Keller | 53—116 X |
| 2,685,994 | 8/1954 | Haumiller et al. | 198—209 X |
| 3,039,565 | 6/1962 | Egner | 198—209 X |
| 3,073,431 | 1/1963 | Davis et al. | 198—209 |

TRAVIS S. McGEHEE, Primary Examiner

U.S. Cl. X.R.

17—45; 53—391